May 20, 1924.  1,494,793

F. W. LINAKER ET AL

PLUG VALVE

Filed April 6, 1922  2 Sheets-Sheet 1

INVENTORS:
Frederick W. Linaker
and Theodore M. Bruback,
By Attorneys,
Fraser, Burk & Myers INVENTORS:
Frederick W. Linaker
and Theodore M. Bruback,
By Attorneys, Patented May 20, 1924.

1,494,793

UNITED STATES PATENT OFFICE.

FREDERICK W. LINAKER AND THEODORE M. BRUBACK, OF DUBOIS, PENNSYLVANIA.

PLUG VALVE.

Application filed April 6, 1922. Serial No. 550,128.

*To all whom it may concern:*

Be it known that we, FREDERICK W. LINAKER and THEODORE M. BRUBACK, the former a subject of the King of Great Britain and the latter a citizen of the United States of America, both residing in Dubois, in the county of Clearfield and State of Pennsylvania, have invented certain new and useful Improvements in Plug Valves, of which the following is a specification.

This invention relates to straightway valves or cocks of the plug type. As the plug of such cocks, being conical and turning in a conical seat or cavity in the valve shell, is liable to stick fast through corrosion, the purpose of the present invention is to provide a construction which will insure the loosening of the plug so that it may be freely turned. To this end the invention provides a loose connection between a plug and the operating means for turning the plug, so that the latter has a certain play or idle motion, and provides means for displacing the plug endwise to loosen it in its seat while the operating part is executing the preliminary portion of its movement, that is to say, during the period of such idle play. The result accomplished is that upon turning the operating handle its first movement moves the plug endwise sufficiently to release it from any adhesion to its seat, after which the plug is turned to close or open the valve.

A construction embodying the invention is illustrated in the accompanying drawings, wherein—

The invention is shown as applied to a plug valve or cock which in the main is of the ordinary construction, comprising a valve shell or casing having inlet and outlet openings for connecting with the pipe, and between them a conical plug chamber in which is mounted a rotatable plug, and with an operating stem passing out from the shell through a stuffing box and terminating exteriorly in an operating handle such as a knob or lever.

Figure 5:
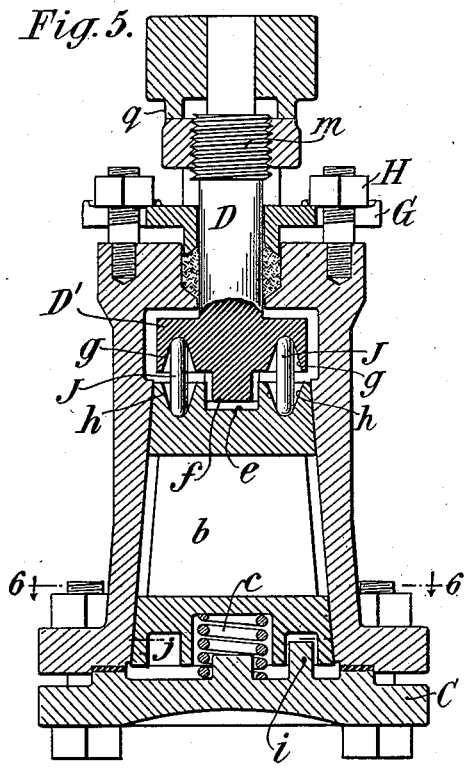
Fig. 5 is a vertical mid-section in a plane at right angles to that of Fig. 1.

In the drawings, A is the valve shell or casing, having inlet and outlet openings, $a$, $a$, on opposite sides, these being screw-threaded or otherwise provided to engage with the ends of the pipe. The shell is formed beneath these openigns with a conical plug chamber in which fits the plug B. The plug has the usual straightway port $b$ through it, and is pressed to its conical seat in the plug chamber by means of a spring $c$ acting against its larger end and reacting against a cover or cap C which is fastened to the valve in any suitable way, with intervening packing or other provision for making a tight joint. In line with the plug is a valve stem D, passing out through a stuffing box E, or any means for preventing leakage, and having fixed on its outer end an operating part or handle F. The inner end of the stem has an enlargement or head D' which is received in a chamber $d$ within the shell, and above this chamber the shell is formed with an upwardly-projecting yoke A' within which is located the gland G of the stuffing box, the projecting ends of this yoke being fastened down by any suitable construction, such as the screws shown at H in Fig. 5.

Figure 4:
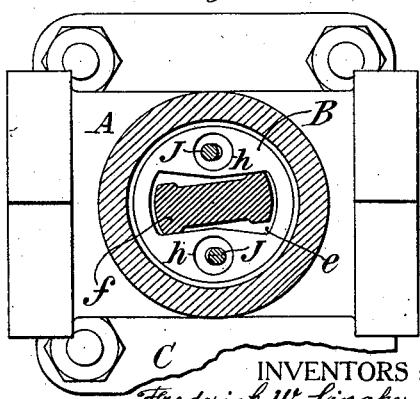
Fig. 4 is a horizontal section in the plane of the line 4—4 in Fig. 2, showing the parts in the same position as in Fig. 2.

At some suitable point between the operating element or handle F and the plug B, there is introduced a loose connection permitting the handle to move through a suitable angular distance before beginning to turn the plug. This preliminary motion is utilized to give endwise displacement to the plug for overcoming any adhesion to its seat. In the construction shown, the loose connection is attained by forming in the top of the plug a recess $e$, and forming on the under side of the head D' a projection $f$, which are so proportioned to each other as to give the projection a certain play in the recess, as shown in Fig. 4. Obviously the recess and projection could be reversed, or any other arrangement affording the requisite lost motion could be substituted.

Figure 1:
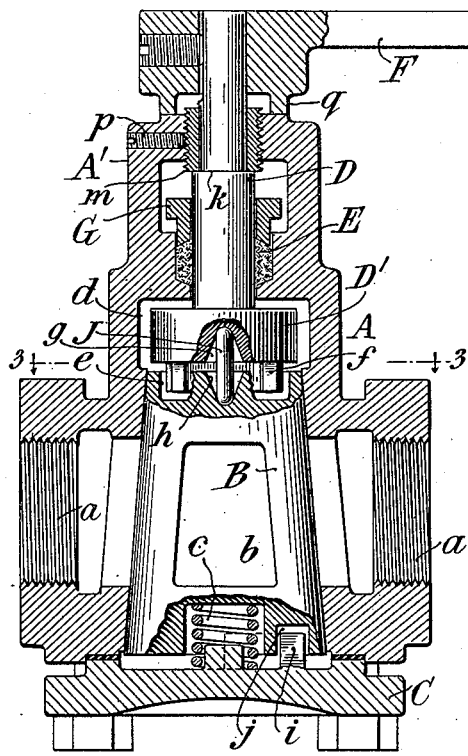
Figure 1 is a vertical mid-section, partly in elevation, the plane of the section coinciding with the axis of the inlet and outlet openings of the valve shell; the valve being shown in the position occupied in the middle of the preliminary movement.
Figure 2:
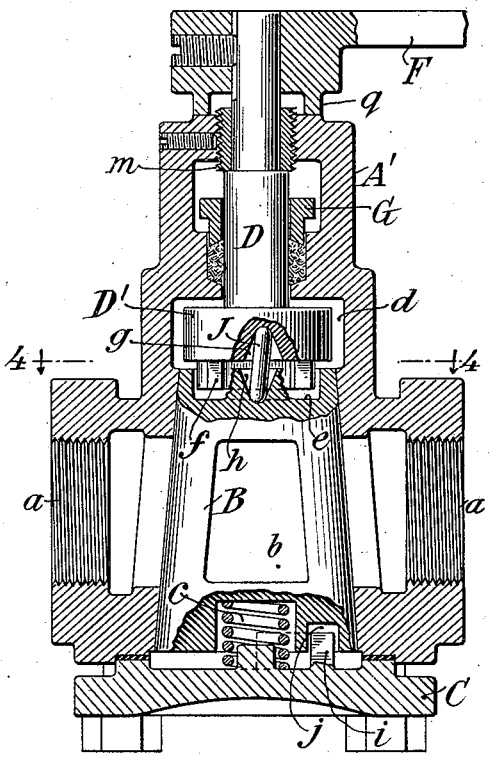
Fig. 2 is a similar section showing the valve with the parts in the position occupied when the valve is closed.
Figure 3:
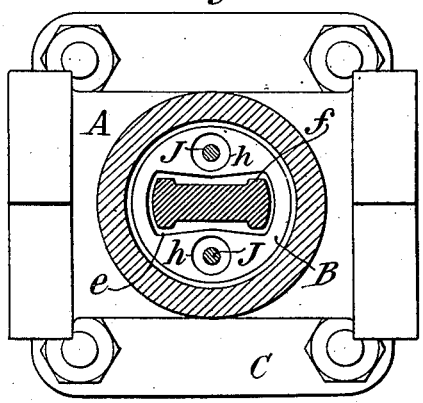
Fig. 3 is a horizontal section in the plane of the line 3—3 in Fig. 1, showing the parts in the same position as in Fig. 1.
Figure 6:
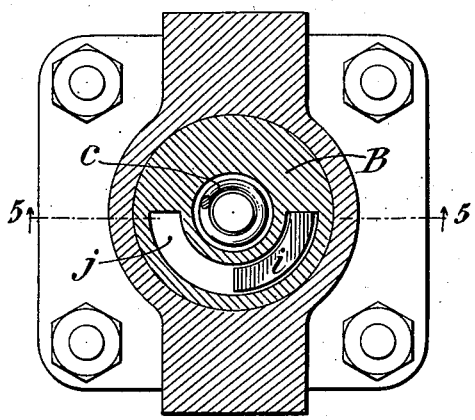
Fig. 6 is a horizontal section on the line 6—6 in Fig. 5.

For imparting the endwise thrust to the plug during this preliminary movement, that is, during the period of lost or idle motion, it is preferable to provide a pair of toggle pins arranged in the manner shown in Figs. 1 to 5, inclusive. For this purpose the under side of the head D' and the upper side of the plug B are formed with recesses $g$ and $h$ respectively, which recesses coincide with one another at the middle of the idle movement; and in these recesses are placed the toggle pins J, J, as clearly shown in Fig. 5. Before the beginning of the idle movement each recess is out of coincidence with its mating recess, so that the toggle pins stand in an oblique position, as clearly shown in Fig. 2; during the idle movement the head D' by its rotative movement carries the upper ends of the pins to points over their lower ends, thereby bringing the pins to vertical position, as shown in Fig. 1, and by reason of this toggle movement exerting a powerful downward thrust upon the plug, the extent of which thrust is sufficient to forcibly loosen the plug from any adhesion to its seat. As the idle movement continues, the pins are carried to an oblique position opposite to their original position, at which time, the lost motion having been taken up, the projection $f$ engages the walls of the recess $e$, and the further movement of the operating handle rotates the plug. The plug should be turned about 90° between its open and closed positions, and it is desirable to introduce any usual stops for limiting its movement, which in the construction shown are formed by means of a 90° arc-shaped rib $i$ projecting upwardly from the cover C into a 180° arc-shaped groove $j$ formed in the under side of the plug B, these parts being best shown in Figs. 5 and 6.

It is essential to the toggle operation that the valve stem with its head D' be so mounted that it cannot yield upwardly during the toggling action, in order that the pressure may be exerted to forcibly drive the plug downwardly. This, in the construction shown, is accomplished by forming the valve stem with a shoulder $k$ which seats against the lower end of an adjustable bushing $m$ preferably screw-threaded into the yoke A' and set in its adjusted position by means of a set-screw $p$. This adjustment enables the parts to be brought into correct relation to insure the correct operation of the toggle pins when the valve is first assembled. The valve stem and its head are held from downward displacement by an annular portion $q$ on the handle F seating against the finished upper face of the yoke A'.

When the valve is in either open or closed position the projection $f$ rests against one side of the recess $e$, as shown in Fig. 4. In operation, the first part of the movement of the handle turns the stem and its head D' without turning the plug, this movement carrying the pin J from its oblique position to one side of the center, to a like oblique position on the opposite side, and during this movement the straightening of the pins causes a heavy downward thrust to be imparted to the plug, so that the latter is unseated at the time when the toggle pins are passing the vertical position. When this first movement is completed, the projection $f$ strikes the opposite side of the recess $e$, and the further turning movement of the handle forcibly turns the plug, which now turns easily because of its having been loosened from its adherence to the conical seat. Thus the movement of the handle is in excess of the 90° movement of the plug to the extent of the preliminary idle movement provided.

The construction of plug valve provided by the present invention has important advantages over the constructions of such valves commonly in use. Such valves are liable, through rust or corrosion, to stick fast in either their open or closed positions, so that they cannot be turned. The present valve is to be distinguished from those having means for loosening the plug by forcing it endwise by a special movement independent of the turning movement of the operating handle. The valve of the present invention utilizes the normal angular opening or closing movement of the operating handle for accomplishing the momentary unseating of the plug. Thus the plug is loosened automatically at the beginning of each turning movement of the valve. The end of each movement leaves the parts in position for first loosening the plug and afterward turning it on the next turning effort. If the valve is only partly open, the same operation takes place as if the valve were wholly opened or closed; that is to say, the first portion of each angular or turning movement loosens the plug before beginning to turn it. It is understood that the invention is not confined to the precise construction shown, as any equivalent construction within the scope of the claims will be within the invention.

We claim as our invention:

1. A plug valve comprising a plug and its operating means, having a loose connection affording idle play, with toggle means operative during such play to force the plug endwise.

2. A plug valve comprising a plug and its operating means, having a loose connection affording idle play, with toggle pins having their ends seated in recesses relatively movable during such play, whereby to force the plug endwise.

3. A plug valve comprising a casing having a conical seat, a plug turning in said seat, a valve stem having a head, the plug and head having opposed recesses, and toggle pins having their ends seated in said respective recesses and adapted upon a turning movement of the head to communicate by the straightening of the pins an endwise displacement to the plug to loosen it in its seat.

In witness whereof, we have hereunto signed our names.

FREDERICK W. LINAKER.
THEODORE M. BRUBACK.